(12) United States Patent
James et al.

(10) Patent No.: US 9,809,266 B1
(45) Date of Patent: Nov. 7, 2017

(54) METHOD OF USING A MOUNT FOR ATTACHING A TABLET TO A POST OF A FORKLIFT SO AS TO ALLOW A USER TO USE THE TABLET FROM EITHER INSIDE OR OUTSIDE OF THE FORKLIFT OR TO STOW THE TABLET

(71) Applicants: Ramesh James, Jamaica, NY (US); Li Zhao, North Babylon, NY (US)

(72) Inventors: Ramesh James, Jamaica, NY (US); Li Zhao, North Babylon, NY (US)

( * ) Notice: Subject to any disclaimer, the term of this patent is extended or adjusted under 35 U.S.C. 154(b) by 30 days.

(21) Appl. No.: 14/999,556

(22) Filed: May 24, 2016

Related U.S. Application Data

(60) Division of application No. 14/120,697, filed on Jun. 17, 2014, now Pat. No. 9,663,338, which is a (Continued)

(51) Int. Cl.
*B60R 7/04* (2006.01)
*B62D 65/16* (2006.01)
(Continued)

(52) U.S. Cl.
CPC .......... *B62D 65/16* (2013.01); *B60R 11/0252* (2013.01); *B60R 2011/004* (2013.01); *B60R 2011/0071* (2013.01)

(58) Field of Classification Search
CPC ....... B60R 7/04; B60R 11/0252; B60R 11/02; B60R 11/0229; B60R 11/0235;
(Continued)

(56) References Cited

U.S. PATENT DOCUMENTS 5,246,240 A * 9/1993 Romich .................... A61G 5/10
108/139
5,632,462 A 5/1997 Kallas .......................... 248/286.1
(Continued)

*Primary Examiner* — Adam Waggenspack
(74) *Attorney, Agent, or Firm* — Bernard S. Hoffman

(57) ABSTRACT

A method of using a mount to attach a tablet to a post of a forklift so as to allow a user to use the tablet from either inside or outside of the forklift or to stow the tablet. The method includes the steps of pulling a locking pin of a release assembly of a mounting case of the mount up out of an original 90° offset through bore in a pivot pipe of the mounting case of the mount, swiveling the mounting case 90° to an outer side of the arm by way of the pivot pipe of the mounting case pivoting, releasing the locking pin of the release assembly of the mounting case into the other 90° offset through bore in the pivot pipe of the mounting case to secure the mounting case from moving and thereby allowing a user to use the tablet from outside of the forklift, pulling the locking pin of the release assembly of the mounting case up out the other 90° offset through bore in the pivot pipe of the mounting case, swiveling the mounting case 90° to an inner side of the arm by way of the pivot pipe of the mounting case pivoting, and releasing the locking pin of the release assembly of the mounting case into the original 90° offset through bore in the pivot pipe of the mounting case to secure the mounting case from moving and thereby allowing a user to use the tablet from inside of the forklift.

2 Claims, 21 Drawing Sheets

Related U.S. Application Data continuation of application No. 13/570,619, filed on Aug. 9, 2012, now abandoned.

(51) Int. Cl.
*B60R 11/02* (2006.01)
*B60R 11/00* (2006.01)

(58) Field of Classification Search
CPC ..... B60R 2011/0294; B60R 2011/0059; B60R 2011/008; B60R 2011/0085; B60R 2011/0087; B60R 2011/0089; B60R 2011/0082; Y10S 248/918; Y10S 248/919; Y10S 248/921; Y10S 248/922; Y10S 248/923; B66F 9/07504; F21V 21/088; F16B 7/0486
USPC .............................. 224/549, 553, 274, 401
See application file for complete search history.

(56) References Cited

U.S. PATENT DOCUMENTS

| | | | | |
|---|---|---|---|---|
| 6,113,047 | A * | 9/2000 | Wung | ................... B60R 11/02 224/929 |
| 7,886,903 | B1 | 2/2011 | Wurzelbacher, Jr. et al. | ............................ 206/320 |
| 8,235,342 | B2 * | 8/2012 | Pfister | ................. F16C 11/103 248/292.14 |
| 9,056,587 | B2 * | 6/2015 | Montgomery | ...... B60R 11/0229 |
| 2012/0018475 | A1 | 1/2012 | Cooper | ........................ 224/401 |

\* cited by examiner

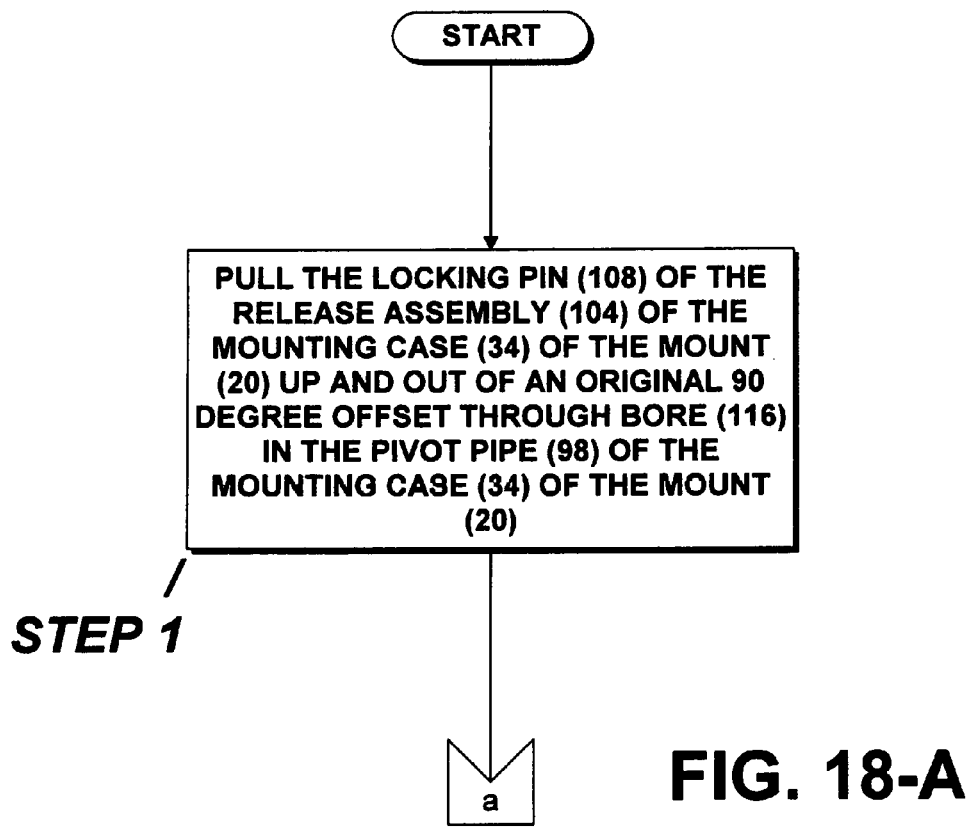
FIG. 18-A

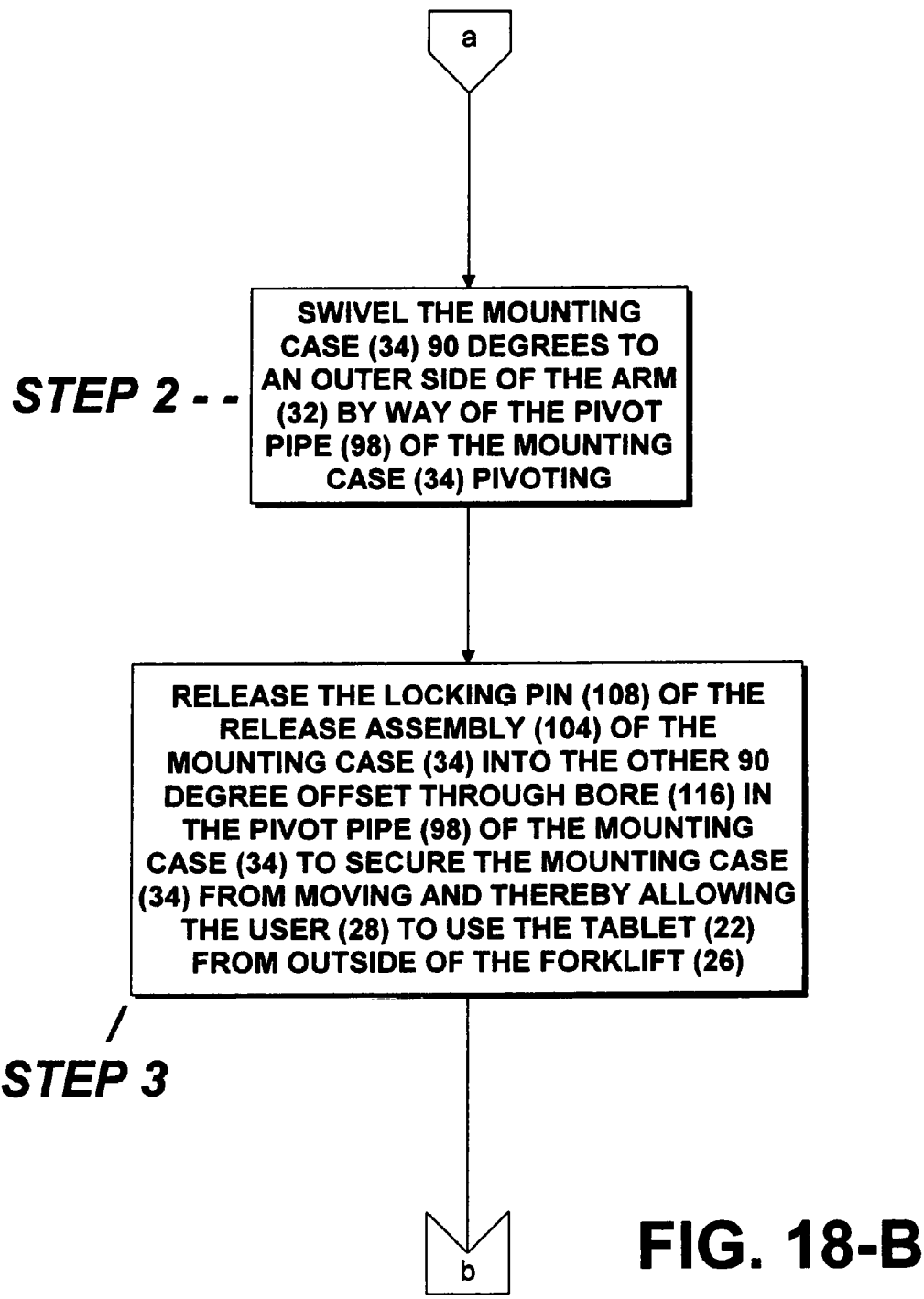
FIG. 18-B

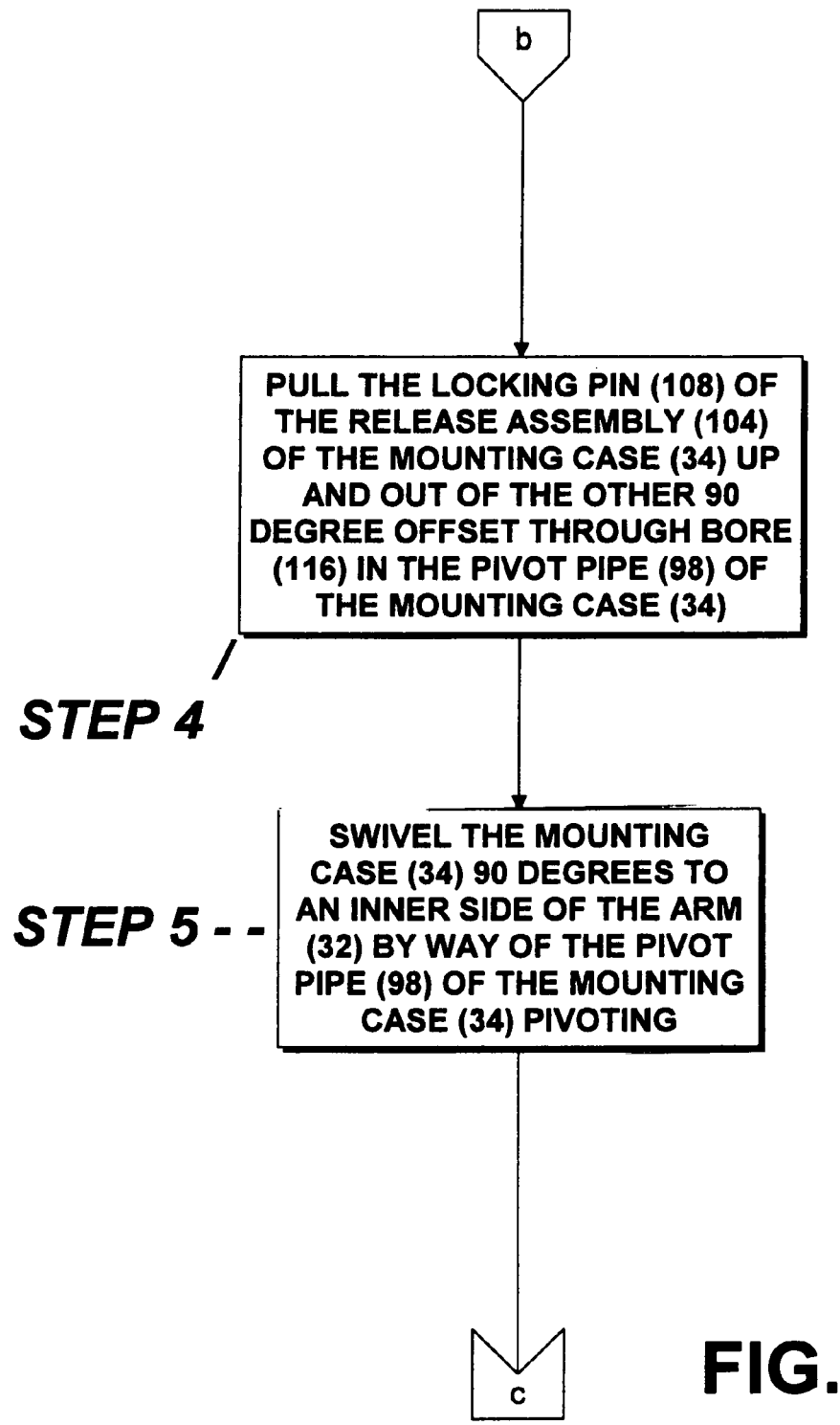
FIG. 18-C

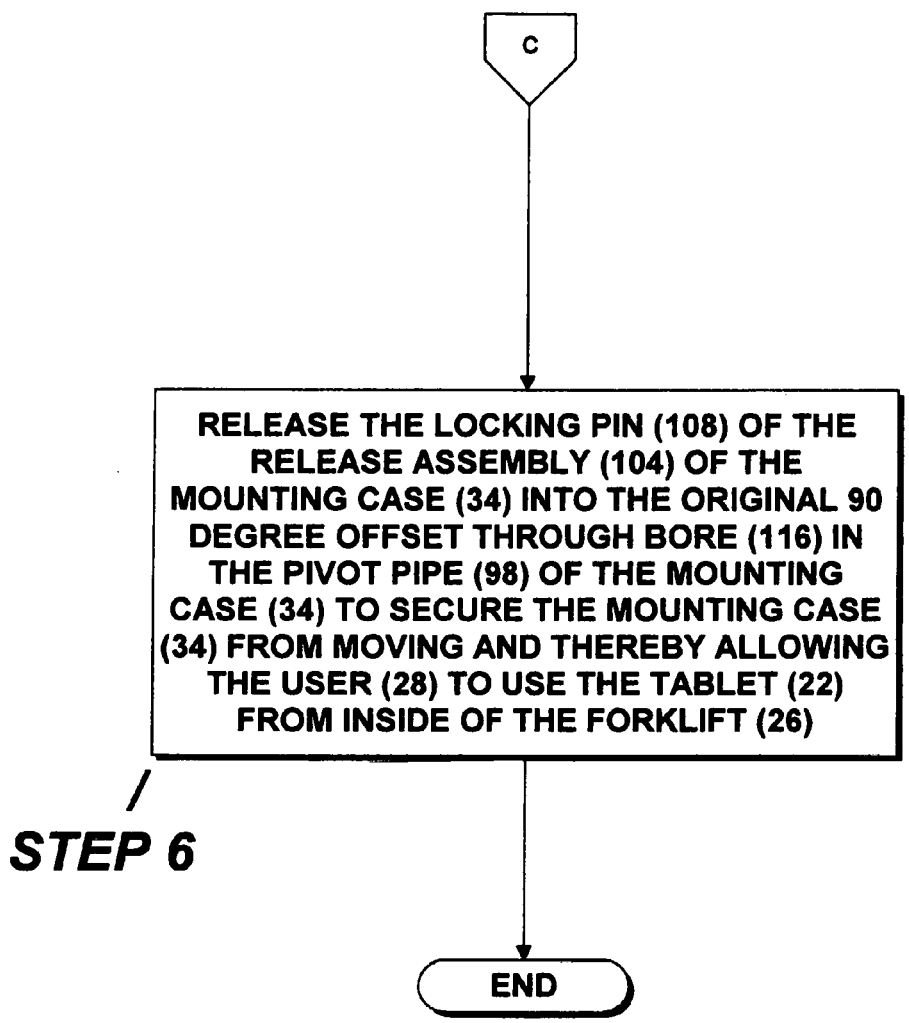
FIG. 18-D

METHOD OF USING A MOUNT FOR ATTACHING A TABLET TO A POST OF A FORKLIFT SO AS TO ALLOW A USER TO USE THE TABLET FROM EITHER INSIDE OR OUTSIDE OF THE FORKLIFT OR TO STOW THE TABLET

CROSS REFERENCE TO RELATED APPLICATIONS

The instant application is a divisional application of application Ser. No. 14/120,697, filed on Jun. 17, 2014, for a MOUNT FOR ATTACHING A TABLET TO A POST OF A FORKLIFT, and incorporated herein in its entirety by reference thereto, and which is a continuation application of application Ser. No. 13/570,619, filed on Aug. 9, 2012, for UNIVERSAL, ADJUSTABLE, STOWABLE ELECTRONIC TABLET HOUSING KIT AND ARM MOUNTING KIT FOR FORKLIFTS, and incorporated herein in its entirety by reference thereto.

BACKGROUND OF THE INVENTION

Field of the Invention

The embodiments of the present invention relate to a method of using a mount, and more particularly, the embodiments of the present invention relate to a method of using a mount for attaching a tablet to a post of a forklift so as to allow a user to use the tablet from either inside or outside of the forklift or to stow the tablet.

Description of the Prior Art

Numerous innovations for electronic interface equipment mounting systems have been provided in the prior art, which will be described below in chronological order to show advancement in the art, and which are incorporated herein in their entirety by reference thereto. Even though these innovations may be suitable for the specific individual purposes to which they address, however, they differ from the embodiments of the present invention in that they do not teach a method of using a mount for attaching a tablet to a post of a forklift so as to allow a user to use the tablet from either inside or outside of the forklift or to stow the tablet.

U.S. Pat. No. 5,632,462 to Kallas

U.S. Pat. No. 5,632,462—issued to Kallas on May 27, 1997 in U.S. class 248 and subclass 286.1—teaches a mounting assembly for a computer or other communications equipment within a vehicle, such as a police vehicle. A mounting bracket is attached to the floor of the vehicle and holds a pair of adjustable arms in a horizontal position, with a piece of communication equipment on one end of the arms. At one end, the arms are secured to the mounting bracket by an adjustable friction clamp, and at the other end, the arms have an adjustable and rotatable clamp.

U.S. Pat. No. 6,113,047 to Wung et al.

U.S. Pat. No. 6,113,047—issued to Wung et al. on Sep. 5, 2000 in U.S. class 248 and subclass 284.1—teaches a vibration-resistant mounting bracket having a base attachable to a support structure by bolts. Isolator bushings are positioned in mounting holes in the bracket to isolate the bracket from shocks and vibration. A pair of arms project perpendicularly from the base. Each arm has a round opening and an arcuate opening concentric with the round opening. A first fastener pivotably connects a terminal to each arm of the bracket, at a pivot axis defined by the round openings. A second fastener has a shaft extending through the arcuate opening and into a second threaded opening in the terminal. The second fastener is tightenable and loosenable to secure the terminal in a pivot position relative to the bracket, and release the terminal from the pivot position to change to a different pivot position.

U.S. Pat. No. 7,886,903 B1 to Wurzelbacher Jr. et al.

U.S. Pat. No. 7,886,903 B1—issued to Wurzelbacher Jr. et al. on Feb. 15, 2011 in U.S. class 206 and subclass 320—teaches a protective shell for a portable computer, which includes an upper shell and a lower shell connected via hinges. The computer is placeable into the shell by slipping a first hinged section of the computer underneath a first clip of the upper shell and then bending back a second clip of the lower shell made of a resilient material so as to allow a second hinged section of the computer to slip into the lower shell. The hinges are positioned on the protective shell so that they are concentric or approximately concentric with a hinge of the portable computer when the protective shell encases the portable computer. A mounting plate is removably attachable to the shell to allow the shell to be connected to various mounting arm assemblies.

United States Patent Application Publication Number US 2012/0018475 to Cooper United States Patent Application Publication Number US 2012/0018475—published to Cooper on Jan. 26, 2012 in U.S. class 224 and subclass 401—teaches a telescoping mount including an outer member, an inner member at least partially received in the outer member so that one member is movable relative to the other member between an extended position and a retracted position, a platform coupled to one of the outer and the inner members for supporting a device, and a locking mechanism. The locking mechanism is operable to substantially lock the position of the outer and the inner members relative to one another in a plurality of non-predefined positions between the extended position and the retracted position. The locking mechanism is movable manually by a user to an unlocked position allowing adjustment of the mount between the extended and retracted positions, and the locking mechanism is movable automatically, upon release of the locking mechanism by the user, to a locked position in which the outer and the inner members are substantially prevented from moving relative to one another.

U.S. Pat. No. 8,235,342 B2 to Pfister et al.

U.S. Pat. No. 8,235,342 B2—issued to Pfister et al. on Aug. 7, 2012 in U.S. class 248 and subclass 292.14—teaches a mounting system for an interface, such as a flat panel display, such as a computer monitor or television, that allows the display to be pivoted about a virtual pivot axis that passes through a center of gravity of the display. The system includes a support that is connected directly or indirectly to a support surface, and a mount that is connected to a back side of the display. The support and the mount are slidable with respect to one another through an arc that has the virtual pivot axis as its center.

It is apparent that numerous innovations for electronic interface equipment mounting systems have been provided in the prior art that are adapted to be used. Furthermore, even though these innovations may be suitable for the specific individual purposes to which they address, however, they would not be suitable for the purposes of the embodiments of the present invention as heretofore described, namely, a method of using a mount for attaching a tablet to a post of a forklift so as to allow a user to use the tablet from either inside or outside of the forklift or to stow the tablet.

SUMMARY OF THE INVENTION

Thus, an object of the embodiments of the present invention is to provide a method of using a mount for attaching a tablet to a post of a forklift so as to allow a user to use the tablet from either inside or outside of the forklift or to stow the tablet, which avoids the disadvantages of the prior art.

Briefly stated, another object of the embodiments of the present invention is to provide a method of using a mount to attach a tablet to a post of a forklift so as to allow a user to use the tablet from either inside or outside of the forklift or to stow the tablet. The method includes the steps of pulling a locking pin of a release assembly of a mounting case of the mount up out of an original 90° offset through bore in a pivot pipe of the mounting case of the mount, swiveling the mounting case 90° to an outer side of the arm by way of the pivot pipe of the mounting case pivoting, releasing the locking pin of the release assembly of the mounting case into the other 90° offset through bore in the pivot pipe of the mounting case to secure the mounting case from moving and thereby allowing a user to use the tablet from outside of the forklift, pulling the locking pin of the release assembly of the mounting case up out the other 90° offset through bore in the pivot pipe of the mounting case, swiveling the mounting case 90° to an inner side of the arm by way of the pivot pipe of the mounting case pivoting, and releasing the locking pin of the release assembly of the mounting case into the original 90° offset through bore in the pivot pipe of the mounting case to secure the mounting case from moving and thereby allowing a user to use the tablet from inside of the forklift.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

BRIEF DESCRIPTION OF THE FIGURES OF THE DRAWING

The figures of the drawing are briefly described as follows:

FIGS. 18A-18D are a flowchart of the method of using the release assembly of the mounting case of the mount of the embodiments of the present invention to use the tablet that is attached to the forklift by the mount of the embodiments of the present invention from first outside of the forklift and then from inside of the forklift;
ADDENDUM 1 is labeled photographs in support of FIGS. 4-16; and
ADDENDUM 2 is labeled photographs in addition to ADDENDUM 1 containing similar subject matter.

Figure 1:
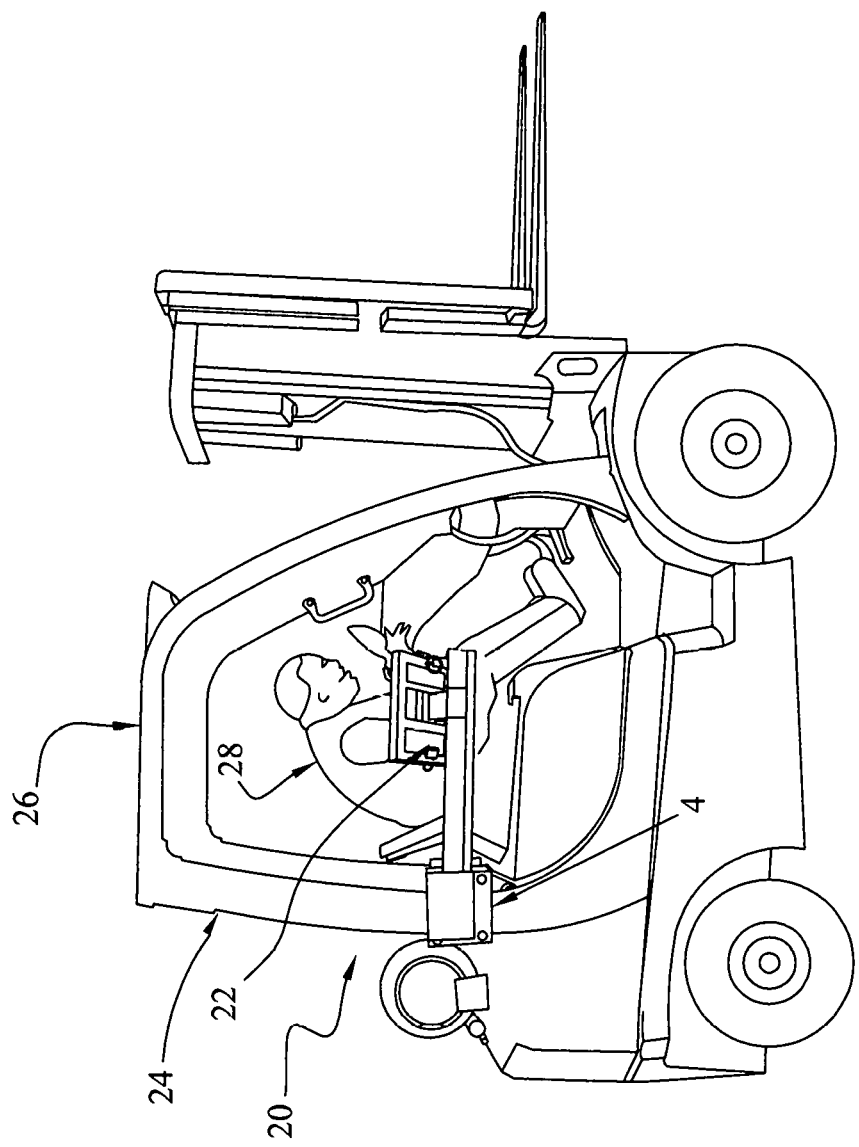
FIG. 1 is a diagrammatic perspective view of the mount of the embodiments of the present invention attaching a tablet to a post of a forklift in a position to allow a user to use the tablet from inside of the forklift.

LIST OF REFERENCE NUMERALS UTILIZED
IN THE FIGURES OF THE DRAWING

Introductory 20 mount of embodiments of present invention for attaching tablet 22 to post 24 of forklift 26 so as to allow user 28 to use tablet 22 from either inside of forklift 26 or outside of forklift or to stow tablet 22
22 tablet
24 post of forklift 26
26 forklift
28 user Overall Configuration of Mount 20

30 clamp for attaching to post 24 of forklift 26
32 arm
34 mounting case for receiving tablet 22

Specific Configuration of Clamp 30

36 outer wall of clamp 30
38 inner wall of clamp 30 for positioning inboard of, and generally parallel to, inner side of post 24 of forklift 26
39 carriage bolts of clamp 30
40 web of outer wall 36 of clamp 30 for positioning outboard of, and generally parallel to, outer side of post 24 of forklift 26
42 pair of flanges of outer wall 36 of clamp 30 for positioning outboard of, and generally parallel to, front and back of post 24 of forklift 26, respectively
44 pair of vertical ends of web 40 of outer wall 36 of clamp 30
45 vertical terminal ends of pair of flanges 42 of outer wall 36 of clamp 30, respectively
46 through bores in outer wall 36 of clamp 30
48 door of clamp 30 for preventing unauthorized access to, and possible tampering with, nuts of clamp 30
50 hinge of clamp 30
51 double arrow of door 48 movement
52 lock of clamp 30
54 socket of clamp 30 for allowing user 28 to stow tablet 22
56 side wall of socket 54 of clamp 30
57 free end of side wall 56 of socket 54 of clamp 30
58 rear wall of socket 54 of clamp 30
60 bottom wall of socket 54 of clamp 30
62 vertical end of rear wall 58 of socket 54 of clamp 30

Specific Configuration of Arm 32

64 proximal end of arm 32
66 distal end of arm 32
68 top wall of arm 32
70 side wall of arm 32
72 cutout of arm 32

Specific Configuration of Mounting Case 34

74 backing plate of mounting case 34
76 pair of terminal side ends of backing plate 74 of mounting case 34
78 front cover of mounting case 34
80 peripheral wall of front cover 78 of mounting case 34 for providing space in mounting case 34 for tablet 22
82 double arrow of front cover 78 of mounting case 34 movement
84 hinge of mounting case 34
86 lock of mounting case 34 for preventing unauthorized access to, and possible tampering with, tablet 22
88 through spaces in backing plate 74 of mounting case 34 for venting heat from tablet 22
90 pair of braces of mounting case 34
92 pedestal of mounting case 34
94 proximal end of pedestal 92 of mounting case 34
96 distal end of pedestal 92 of mounting case 34
98 pivot pipe of mounting case 34 for allowing user 28 to use tablet 22 from either inside of forklift 26 or outside of forklift 26
100 viewing window of front cover 78 of mounting case 34 for allowing viewing of, and interfacing with, tablet 22
102 collar of mounting case 34
103 double arrows of pivot pipe 98 of mounting case 34 movement
104 release assembly of mounting case 34
106 housing of release assembly 104 of mounting case 34
108 locking pin of release assembly 104 of mounting case 34
109 double arrow of locking pin 108 of release assembly 104 of mounting case 34 movement
110 proximal end of locking pin 108 of release assembly 104 of mounting case 34
111 distal end of locking pin 108 of release assembly 104 of mounting case 34
112 first seat of release assembly 104 of mounting case 34
113 second seat of release assembly 104 of mounting case 34
114 coil spring of release assembly 104 of mounting case 34
116 pair of 90° offset through bores in pivot pipe 98 of mounting case 34
118 through bore of proximal end 110 of locking pin 108 of release assembly 104 of mounting case 34
120 pull ring of release assembly 104 of mounting case 34 for facilitating pulling up on proximal end 110 of locking pin 108 of release assembly 104 of mounting case 34
122 charging wire of mounting case 34

DETAILED DESCRIPTION OF THE PREFERRED EMBODIMENTS

Introductory

Figure 2:
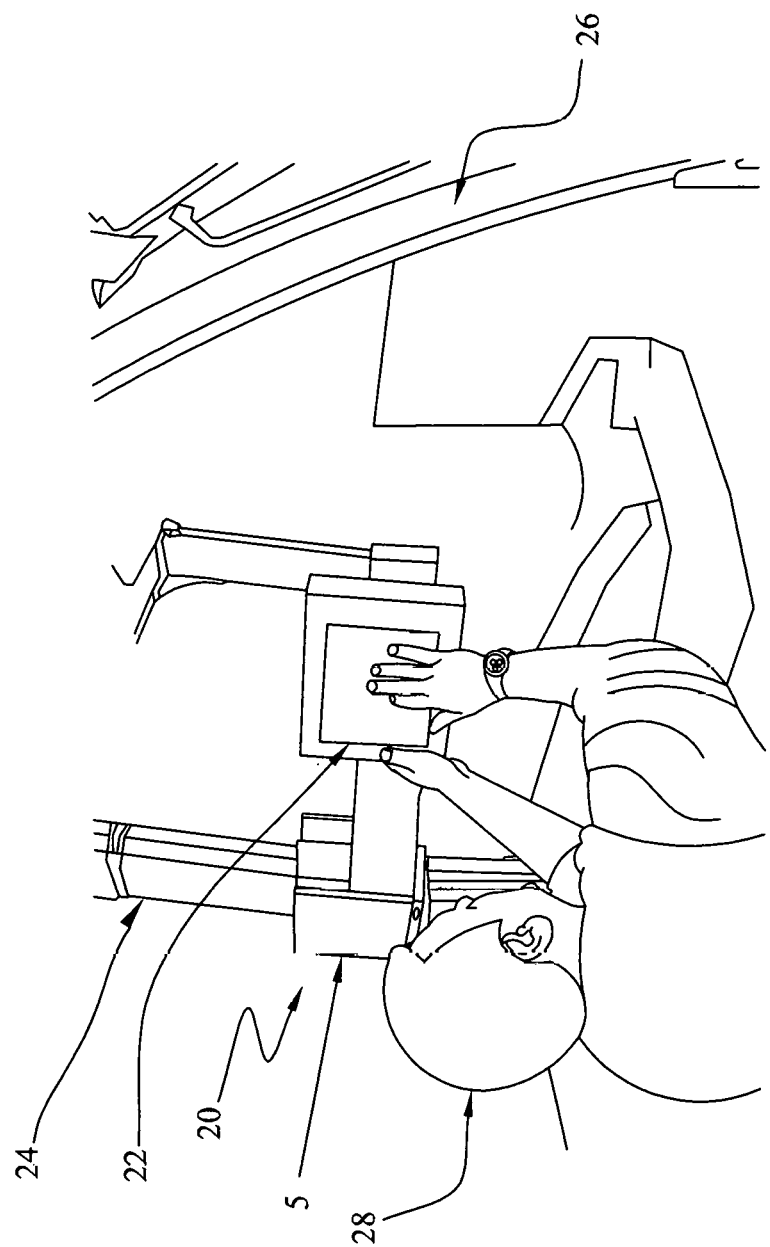
FIG. 2 is a diagrammatic perspective view of the mount of the embodiments of the present invention attaching a tablet to a post of a forklift in a position to allow a user to use the tablet from outside of the forklift.
Figure 3:
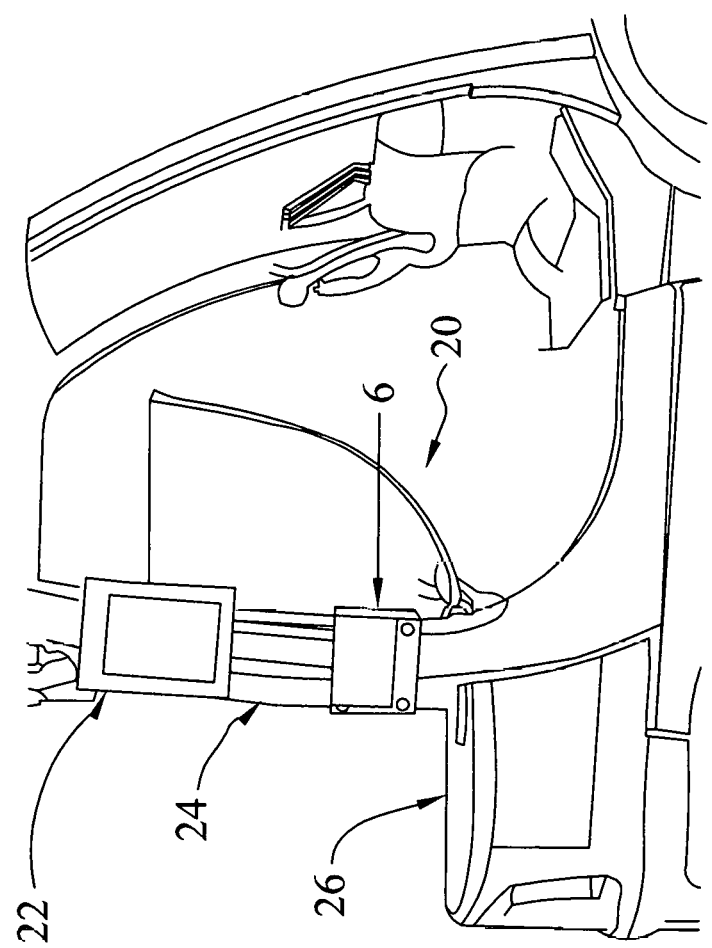
FIG. 3 is a diagrammatic perspective view of the mount of the embodiments of the present invention attaching a tablet to a post of a forklift in a position to allow a user to stow the tablet.

Referring now to the figures, in which like numerals indicate like parts, and particularly to FIGS. 1, 2, and 3, the mount of the embodiments of the present invention is shown generally at 20 for attaching a tablet 22 to a post 24 of a forklift 26 so as to allow a user 28 to use the tablet 22 from either inside of the forklift 26 (FIG. 1) or outside of the forklift 26 (FIG. 2) or to stow the tablet 22 (FIG. 3).

It is to be understood that the mount of the embodiments of the present invention is not just limited for use with a tablet, but can be used with any portable electronic device without departing in any way from the spirit of the mount of the embodiments of the present invention.

Overall Configuration of the Mount 20

Figure 4:
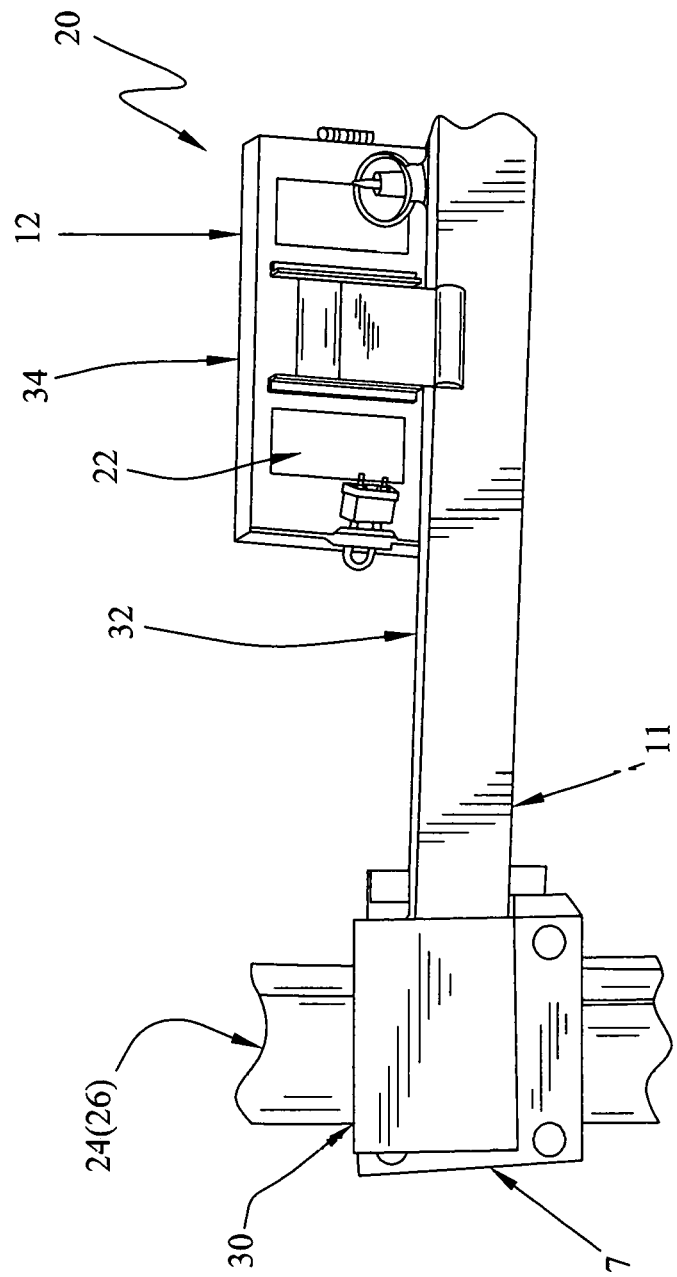
FIG. 4 is an enlarged diagrammatic perspective view of the mount of the embodiments of the present invention identified by ARROW 4 in FIG. 1 in position for using the tablet from inside of the forklift.
Figure 5:
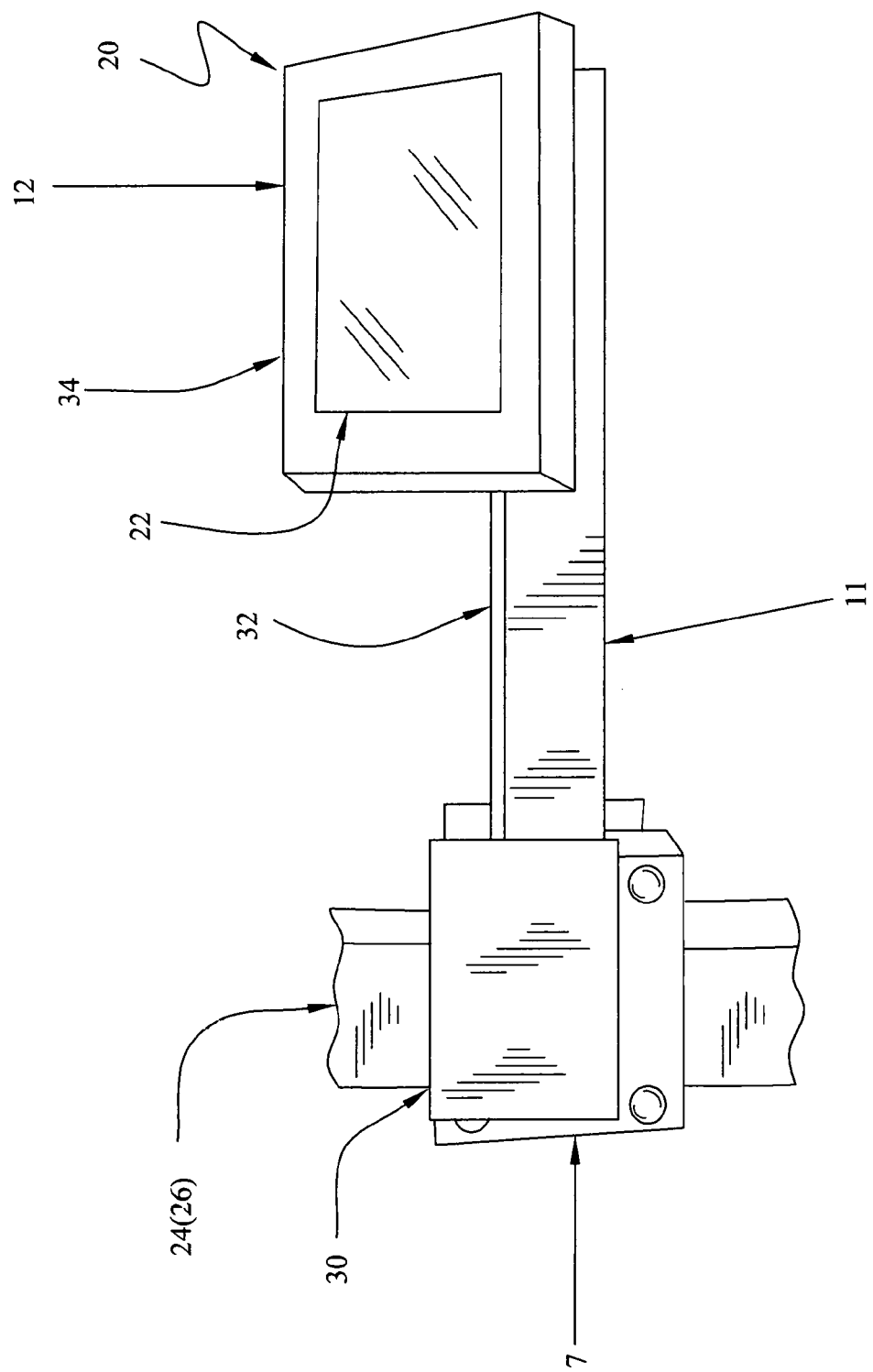
FIG. 5 is an enlarged diagrammatic perspective view of the mount of the embodiments of the present invention identified by ARROW 5 in FIG. 2 in position for using the tablet from outside of the forklift.
Figure 6:
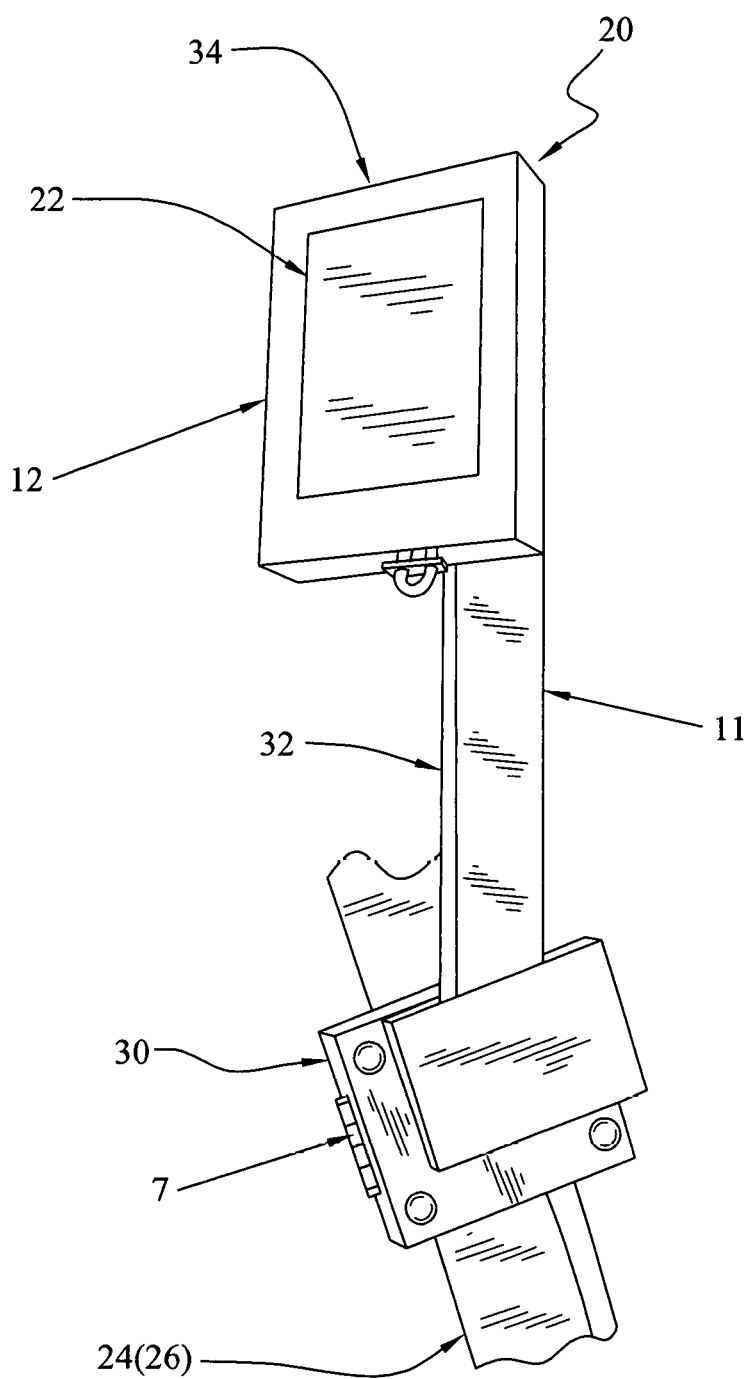
FIG. 6 is an enlarged diagrammatic perspective view of the mount of the embodiments of the present invention identified by ARROW 6 in FIG. 3 in position for stowing the tablet.
Figure 7:
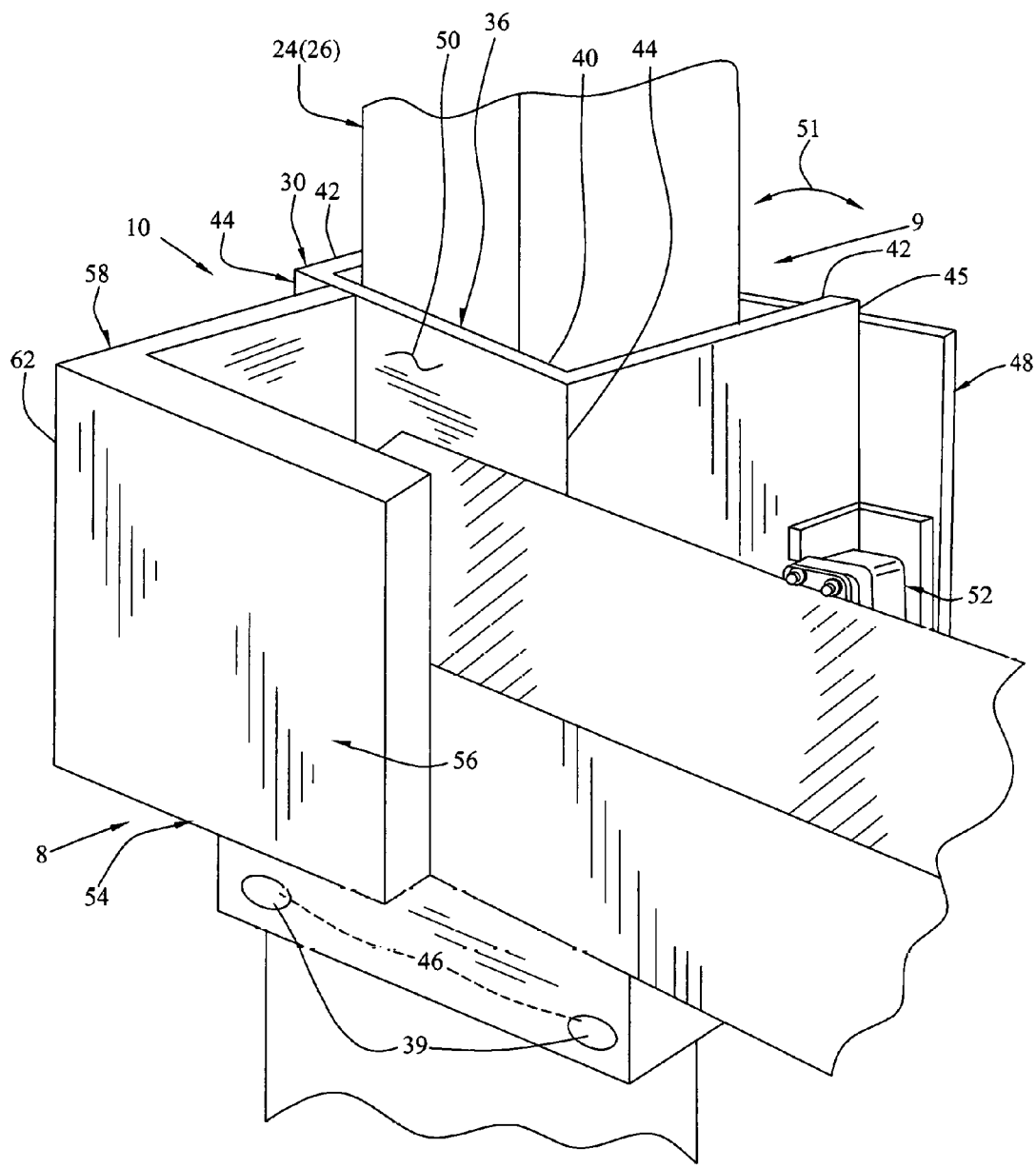
FIG. 7 is an enlarged diagrammatic perspective view of the clamp of the mount of the embodiments of the present invention identified by ARROW 7 in FIGS. 4, 5, and 6.
Figure 8:
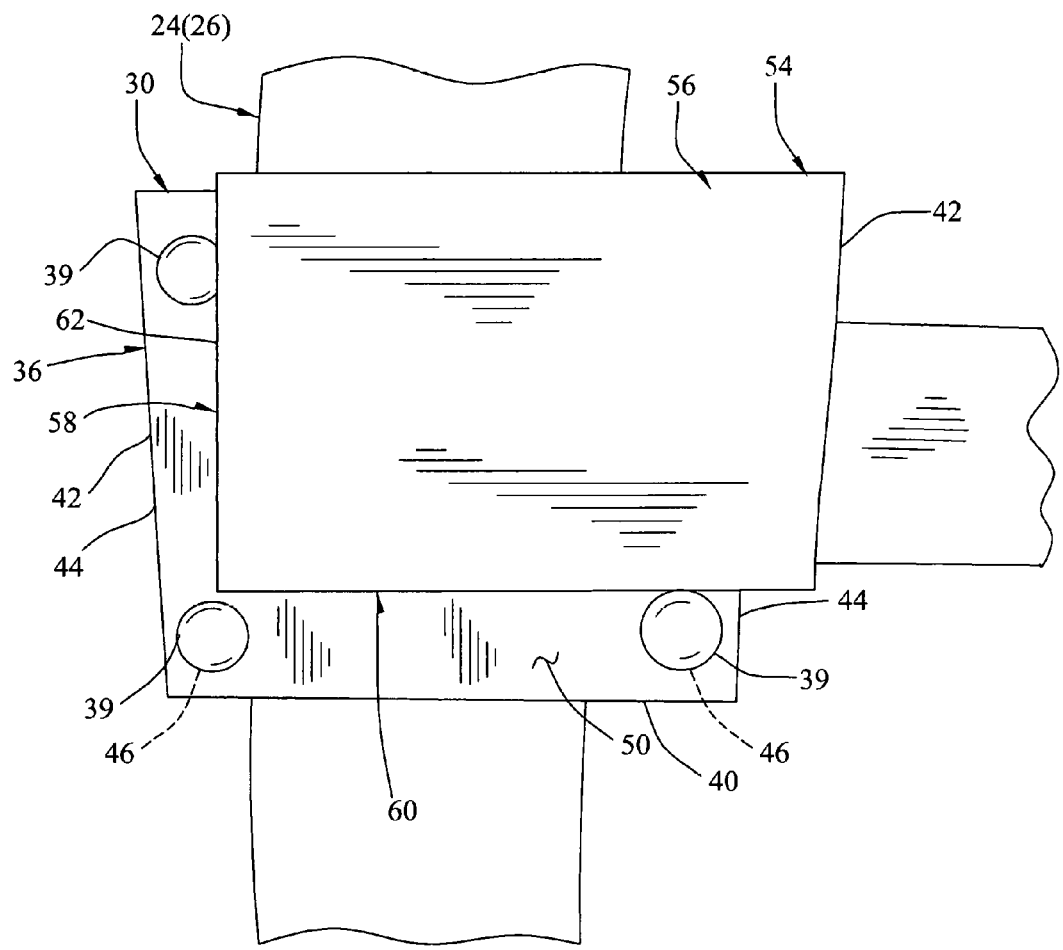
FIG. 8 is a diagrammatic side elevational view of the clamp of the mount of the embodiments of the present invention taken generally in the direction of ARROW 8 in FIG. 7.
Figure 9:
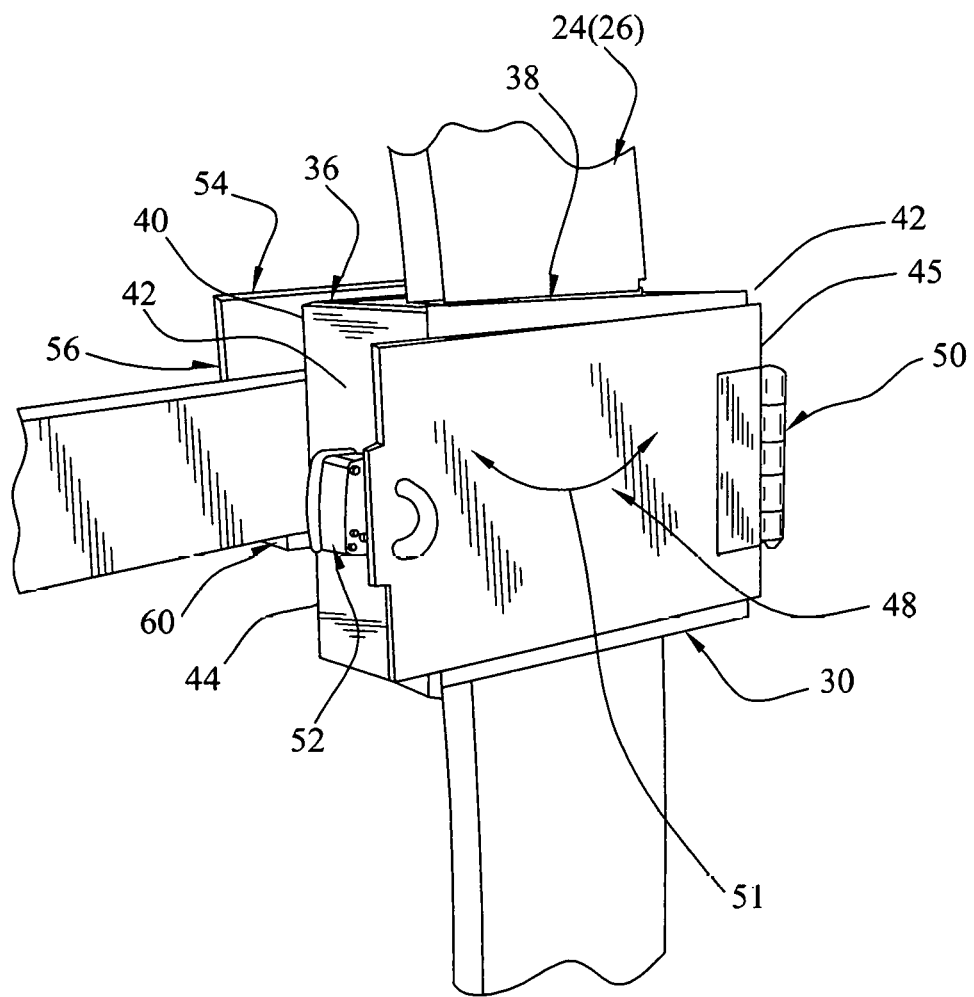
FIG. 9 is a reduced diagrammatic perspective view of the clamp of the mount of the embodiments of the present invention taken generally in the direction of ARROW 9 in FIG. 7.
Figure 10:
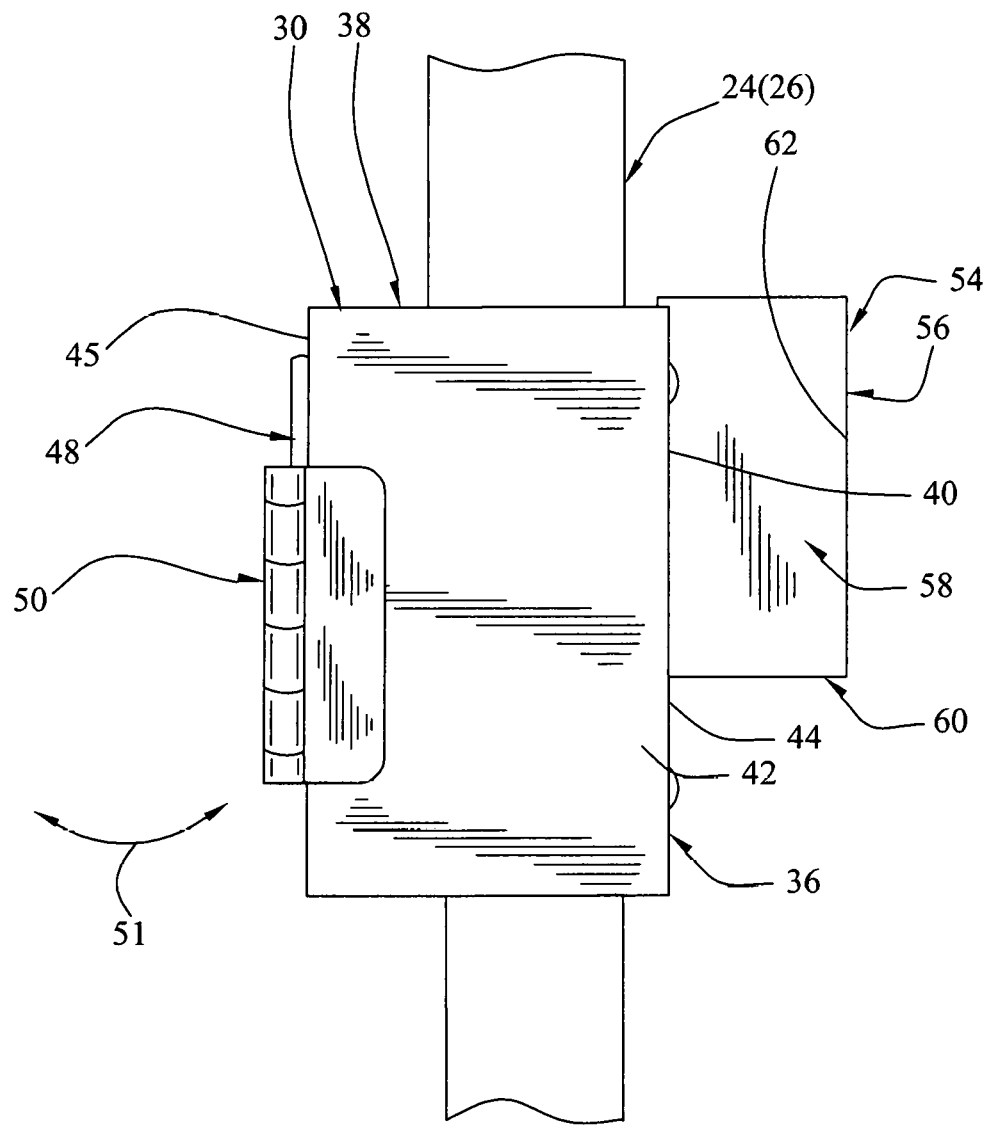
FIG. 10 is a reduced diagrammatic rear end view of the clamp of the mount of the embodiments of the present invention taken generally in the direction of ARROW 10 in FIG. 7.

The overall configuration of the mount 20 can best be seen in FIGS. 4, 5, and 6, and as such, will be discussed with reference thereto.

The mount 20 comprises a clamp 30, an arm 32, and a mounting case 34.

The clamp 30 is for attaching to the post 24 of the forklift 26.

The arm 32 pivotally extends from the clamp 30 for allowing the user 28 to stow the tablet 22.

The mounting case 34 is for receiving the tablet 22 and pivotally extends from the arm 32 for allowing the user 28 to use the tablet 22 from either the inside of the forklift 26 or the outside of the forklift 26.

Thus, the tablet 22 is positionable in three different positions, namely, for being stowed, for being used from inside of the forklift 26, and for being used from outside of the forklift 26.

Specific Configuration of the Clamp 30

The specific configuration of the clamp 30 can best be seen in FIGS. 7, 8, 9, and 10, and as such, will be discussed with reference thereto.

The clamp 30 comprises an outer wall 36 and an inner wall 38.

The outer wall 36 of the clamp 30 opposes the inner walls 38 of the clamp 30, and together with the inner wall 38 of the clamp 30, are for replaceably clamping the post 24 of the forklift 26 therebetween, while maintaining the post 24 of the forklift 26 therebetween by complementary carriage bolts 39 and nuts and lock washers.

The carriage bolts 39 of the clamp 30 are selected because once the carriage bolts 39 of the clamp 30 are installed, the head of the carriage bolts 39 of the clamp 30 are not engageable to remove the carriage bolts 39 of the clamp 30, and ultimately remove the mount 20 from the post 24 of the forklift 26.

The outer wall 36 of the clamp 30 is U-shaped in plan view, and as such, has a web 40 and a pair of flanges 42.

The web 40 of the outer wall 36 of the clamp 30 is flat, vertically oriented, has a pair of vertical ends 44, and is for positioning outboard of, and generally parallel to, an outer side of the post 24 of the forklift 26.

The pair of flanges 42 of the outer wall 36 of the clamp 30 are flat, vertically oriented, parallel to each other, extend perpendicularly inwardly from the pair of vertical ends 44 of the web 40 of the outer wall 36 of the clamp 30, respectively, to vertical terminal ends 45, and are for positioning outboard of, and generally parallel to, a front and a rear of the post 24 of the forklift 26, respectively.

The inner wall 38 of the clamp 30 is vertically oriented, and is for positioning inboard of, and generally parallel to, an inner side of the post 24 of the forklift 26.

The carriage bolts 39 of the clamp 30 enter first through the lock washers then through bores 46 in the outer wall 36 of the clamp 30, and then through through bores in the inner wall 38 of the clamp 30 where the lock washers and the nuts of the clamp 30 are threaded thereonto.

The clamp 30 further has a door 48.

The door 48 of the clamp 30 is flat, vertically oriented, extends, as by double arrow 51, hingedly by a hinge 50 from the vertical terminal end 45 of one flange 42 of the outer wall 36 of the clamp 30 lockingly, by a lock 52, to past the vertical terminal end 45 of the other flange 42 of the outer wall 36 of the clamp 30, and is for preventing unauthorized access to, and possible tampering with, the nuts of the clamp 30.

The clamp 30 further has a socket 54.

The socket 54 of the clamp 30 is disposed on an outer surface 50 of the web 40 of the outer wall 36 of the clamp 30, and pivotally receives the arm 32 for allowing the user 28 to stow the tablet 22.

The socket 54 of the clamp 30 has a side wall 56, a rear wall 58, and a bottom wall 60.

The rear wall 58 of the socket 54 of the clamp 30 is flat, vertically oriented, and extends perpendicularly outwardly from the outer surface 50 of the web 40 of the outer wall 36 of the clamp 30 to a vertical end 62, and is in close proximity to, and parallel to, a rearmost flange 42 of the outer wall 36 of the clamp 30.

The side wall 56 of the socket 54 of the clamp 30 is flat, vertically oriented, extends perpendicularly forwardly from the vertical end 62 of the rear wall 58 of the socket 54 of the clamp 30 to a free end 57, and is spaced outward of, and parallel to, the web 40 of the outer wall 36 of the clamp 30.

The bottom wall 60 of the socket 54 of the clamp 30 is horizontally oriented, and extends from the web 40 of the outer wall 36 of the clamp 30 to the side wall 56 of the socket 54 of the clamp 30 and further extends to the rear wall 58 of the socket 54 of the clamp 30.

Specific Configuration of the Arm 32

Figure 11:
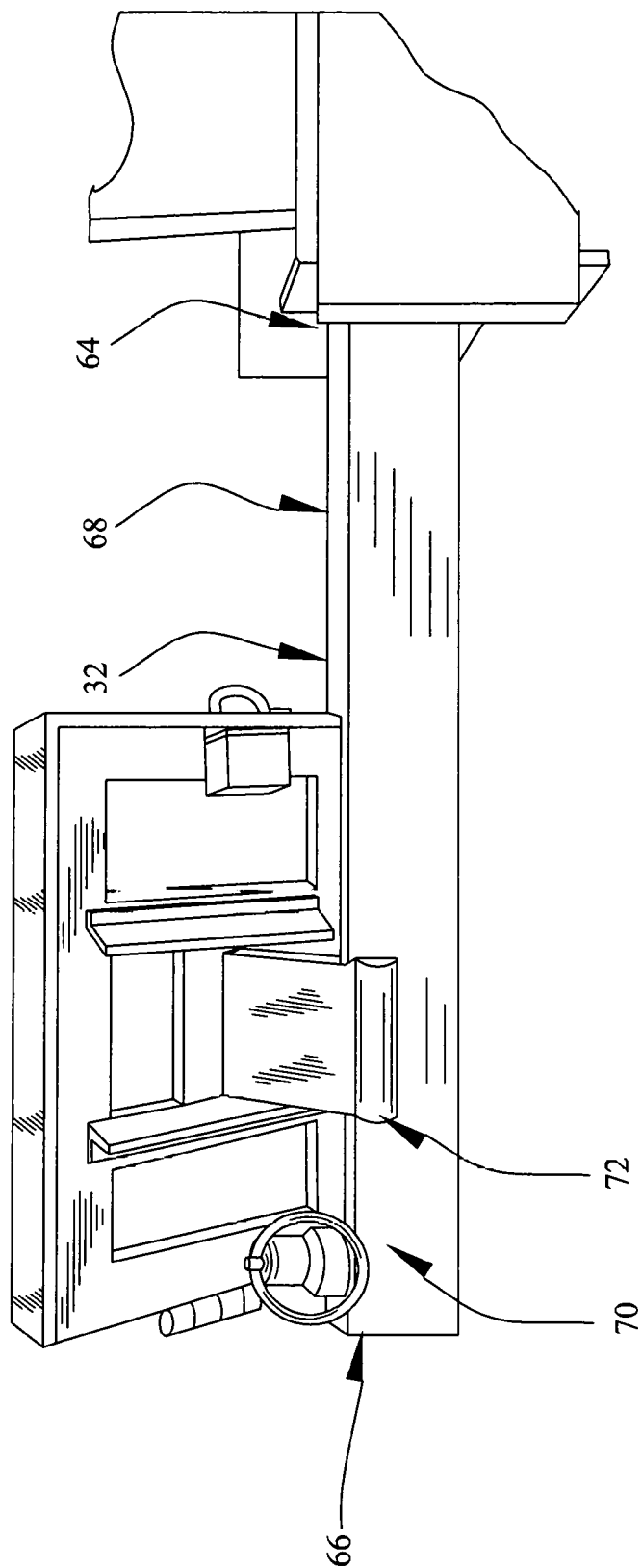
FIG. 11 is an enlarged diagrammatic perspective view of the arm of the mount of the embodiments of the present invention identified by ARROW 11 in FIGS. 4, 5, and 6 in a position to allow a user to use the tablet from outside of the forklift.
Figure 12:
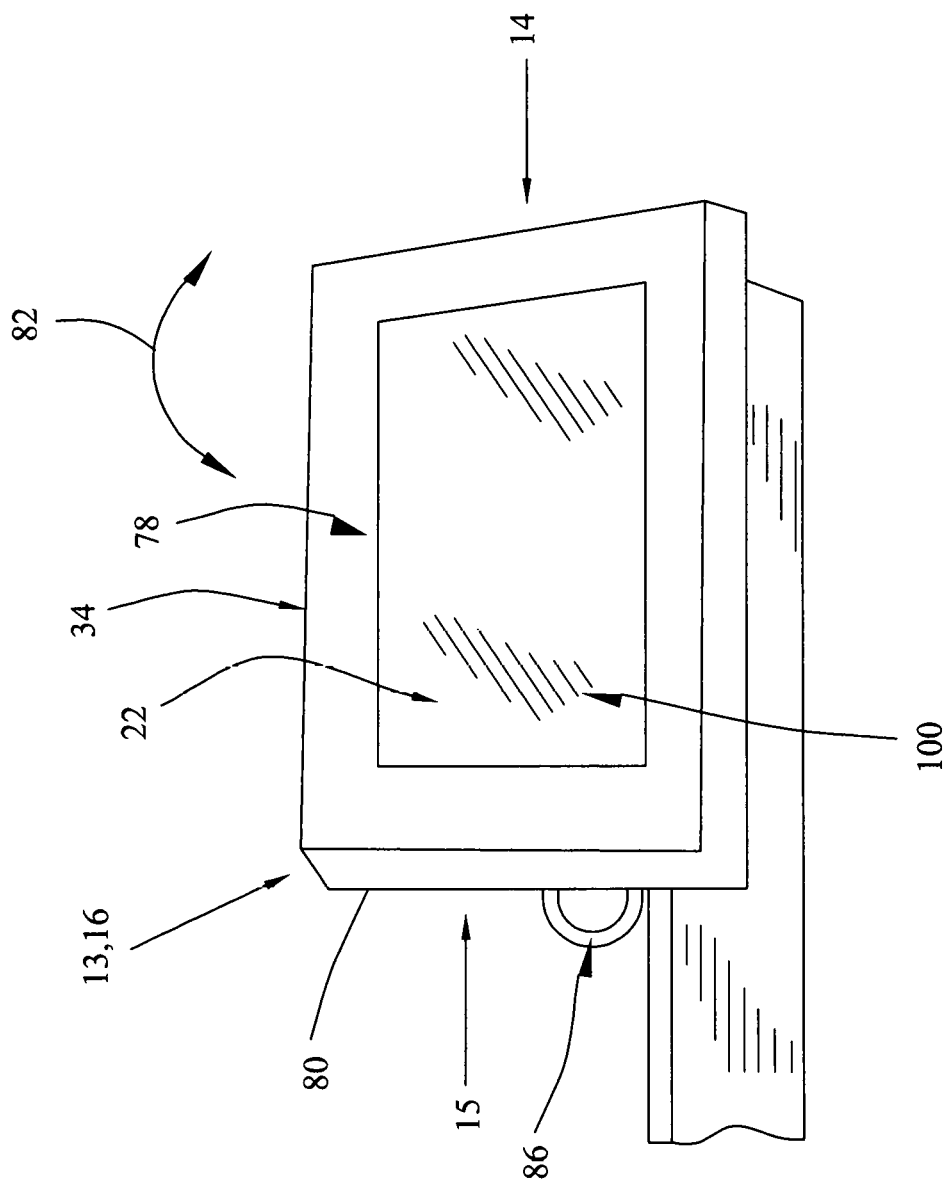
FIG. 12 is an enlarged diagrammatic front perspective view of the mounting case of the mount of the embodiments of the present invention identified by ARROW 12 in FIGS. 4, 5, and 6 in a position to allow a user to use the tablet from outside of the forklift.
Figure 13:
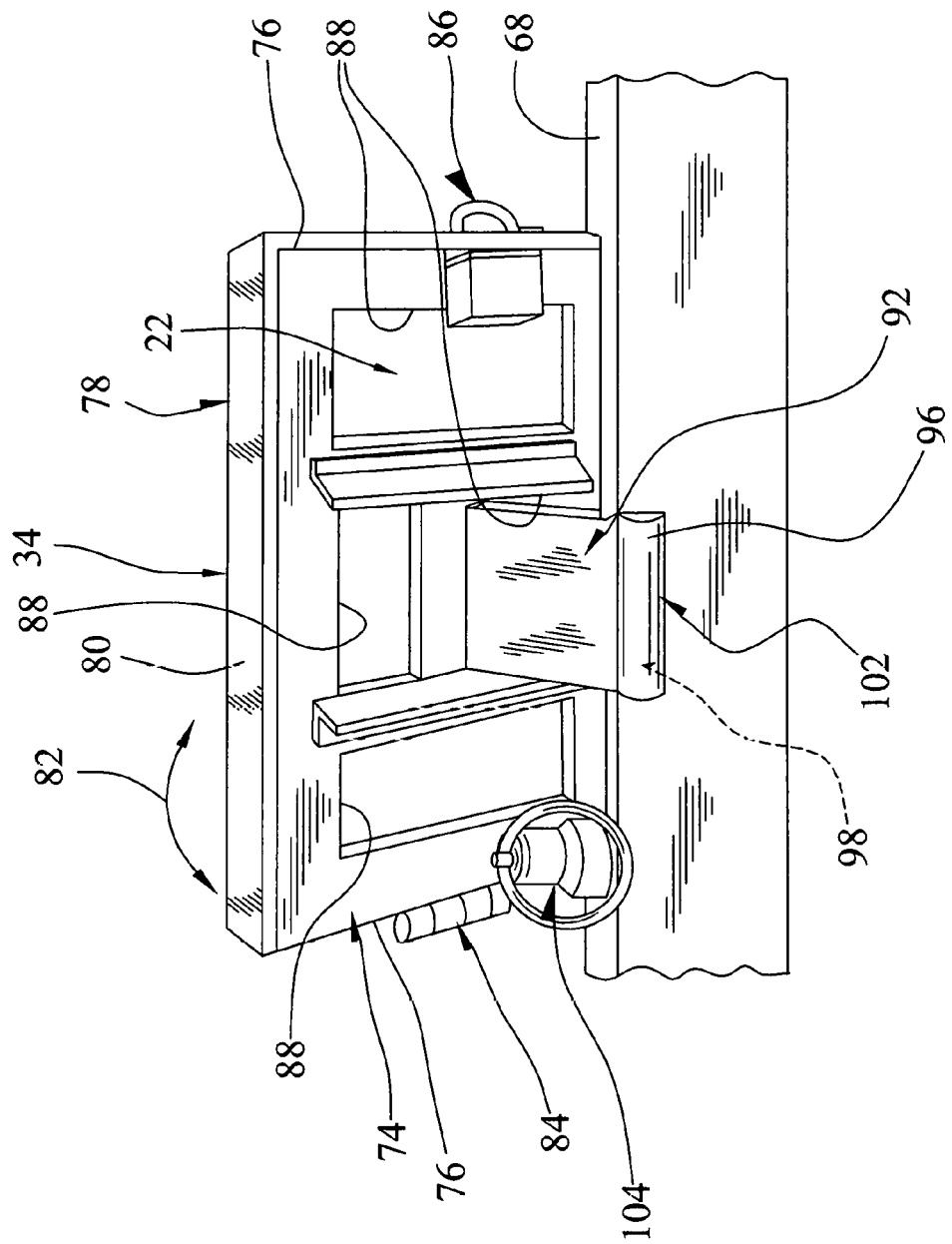
FIG. 13 is a diagrammatic rear perspective view of the mounting case of the mount of the embodiments of the present invention taken in the direction of ARROW 13 in FIG. 12 in a position to allow a user to use the tablet from outside of the forklift.
Figure 14:
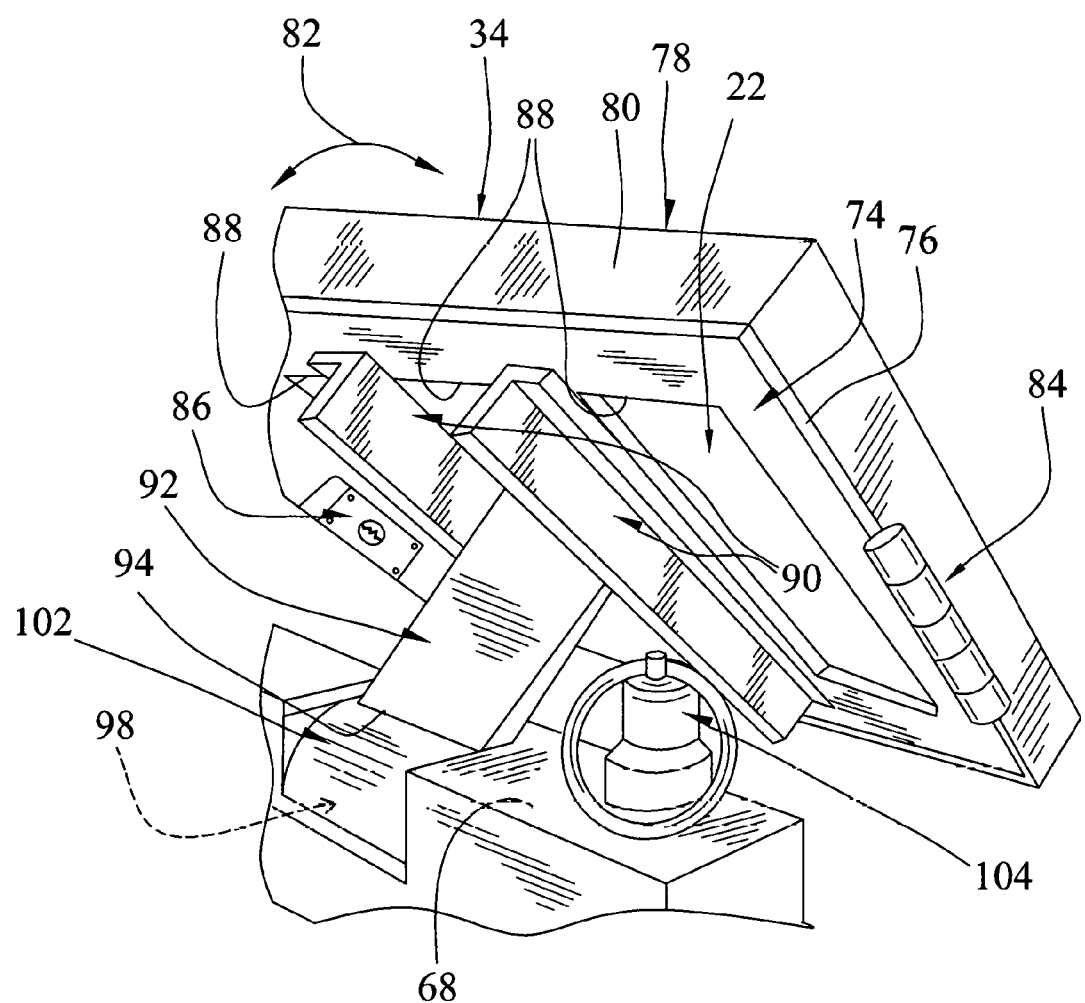
FIG. 14 is an enlarged diagrammatic side perspective view of the mounting case of the mount of the embodiments of the present invention taken in the direction of ARROW 14 in FIG. 12 in a position to allow a user to use the tablet from inside of the forklift.
Figure 15:
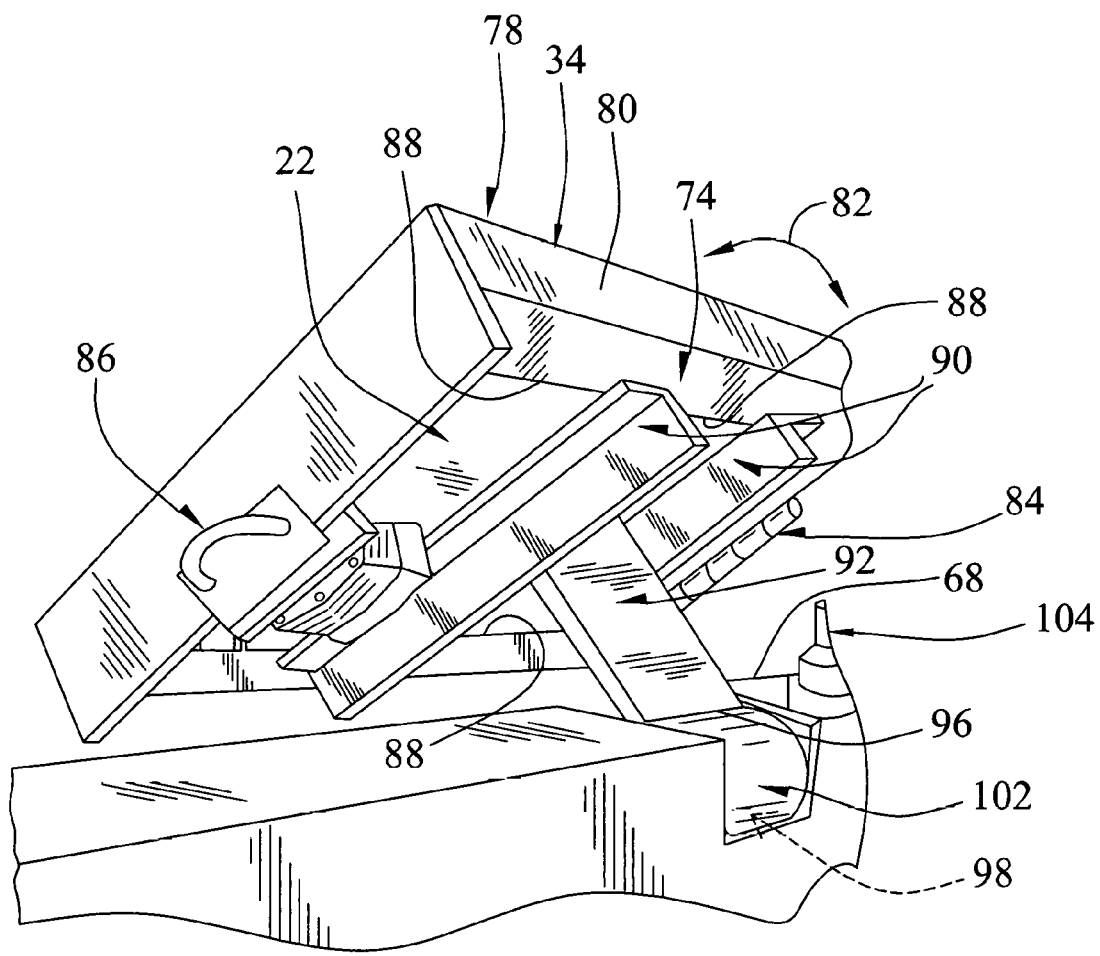
FIG. 15 is an enlarged diagrammatic opposite side perspective view of the mounting case of the mount of the embodiments of the present invention taken in the direction of ARROW 15 in FIG. 12 in a position to allow a user to use the tablet from inside of the forklift.
Figure 16:
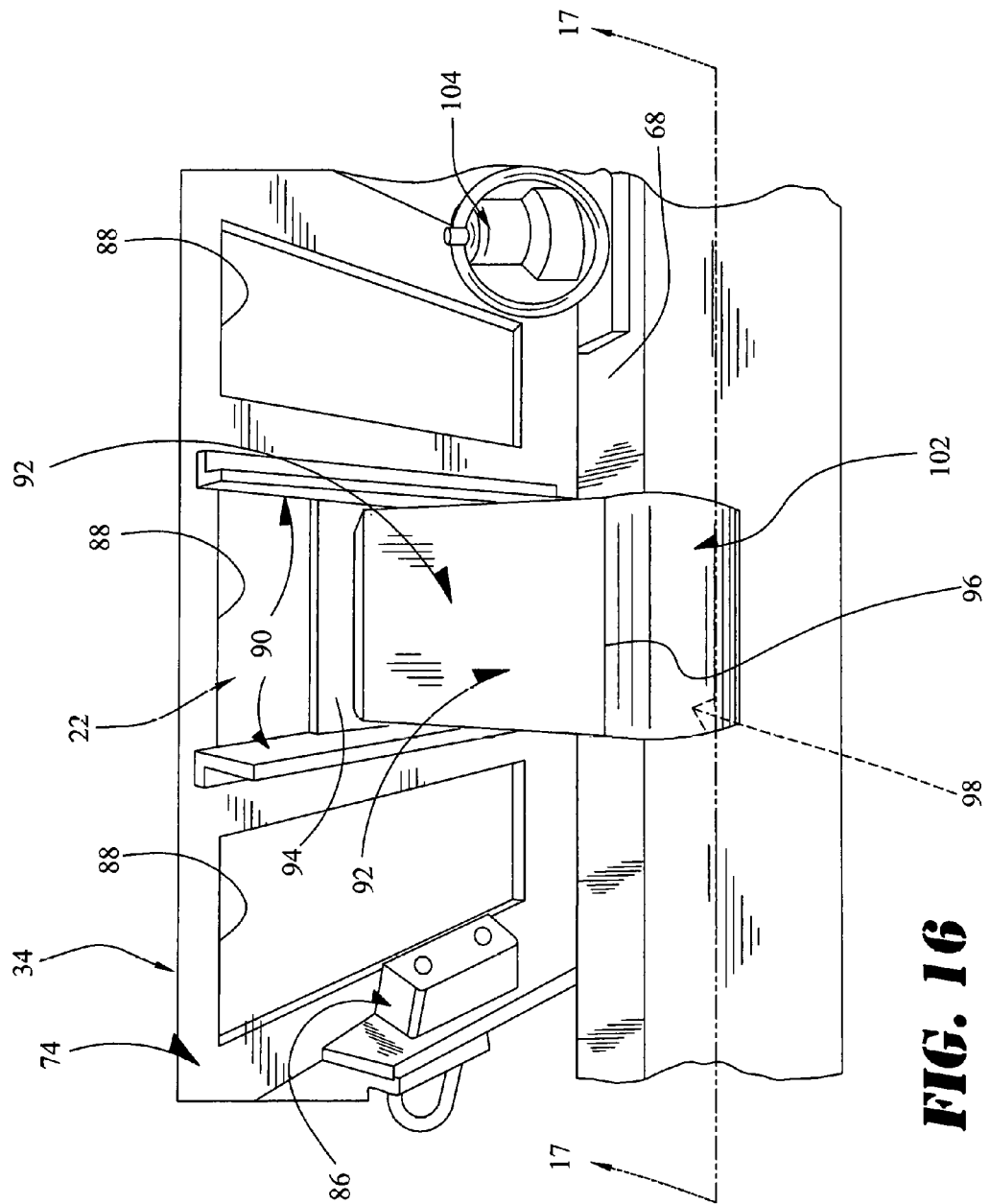
FIG. 16 is an enlarged diagrammatic rear perspective view of the mounting case of the mount of the embodiments of the present invention taken in the direction of ARROW 16 in FIG. 12 in a position to allow a user to use the tablet from inside of the forklift.

The specific configuration of the arm 32 can best be seen in FIG. 11, and as such, will be discussed with reference thereto.

The arm 32 is straight, slender, elongated, hollow, moveable in a vertical plane parallel to, and between, the web 40 of the outer wall 36 of the clamp 30 and the side wall 56 of the socket 54 of the clamp 30, and has a proximal end 64, a distal end 66, a top wall 68, and a side wall 70.

The proximal end 64 of the arm 32 is pivotally attached within the socket 54 of the clamp 30, and is movable in the vertical plane parallel to, and between, the web 40 of the outer wall 36 of the clamp 30 and the side wall 56 of the socket 54 of the clamp 30.

The arm 32 further has a cutout 72.

The cutout 72 of the arm 32 extends continuously into both the top wall 68 of the arm 32 and the side wall 70 of the arm 32, and is disposed inward of the distal end 66 of the arm 32.

It is to be understood that the mount 20 can be mounted to beams, posts, pipes, and even the wall inside of workshops, warehouses, and service stations, and as a retractable and storable mount for a door/counter electronic tablet, a television, or even a security screen display.

Specific Configuration of the Mounting Case 34

The specific configuration of the mounting case 34 can best be seen in FIGS. 12, 13, 14, 15, 16, and 17, and as such, will be discussed with reference thereto.

The mounting case 34 comprises a backing plate 74.

The backing plate 74 of the mounting case 34 is flat, generally rectangular-shaped, and has a pair of terminal side ends 76.

The mounting case 34 further comprises a front cover 78.

The front cover 78 of the mounting case 34 is flat, and has a peripheral wall 80 therearound for providing space in the mounting case 34 for the tablet 22.

The front cover 78 of the mounting case 34 extends, as by double arrow 82, hingedly, by a hinge 84, from one terminal side end 76 of the backing plate 74 of the mounting case 34, lockingly, by a lock 86, to the other terminal side end 76 of the backing plate 74 of the mounting case 34 for preventing unauthorized access to, and possible tampering with, the tablet 22.

The backing plate 74 of the mounting case 34 further has through spaces 88.

The through spaces 88 in the backing plate 74 of the mounting case 34 are for venting heat from the tablet 22.

The mounting case 34 further comprises a pair of braces 90.

The pair of braces 90 of the mounting case 34 are angle irons, are parallel to each other, are spaced-apart from each other, extend along the backing plate 74 of the mounting case 34, and are inboard of, and parallel to, the pair of terminal side ends 76 of the backing plate 74 of the mounting case 34, respectively.

The mounting case 34 further comprises a pedestal 92.

The pedestal 92 of the mounting case 34 is flat, generally rectangular-shaped, and has a proximal end 94 and a distal end 96.

The pedestal 92 of the mounting case 34 extends rearwardly, downwardly, and fixedly from the pair of braces 90 of the mounting case 34 to the cutout 72 of the arm 32, with the proximal end 94 of the pedestal 92 of the mounting case 34 being affixed to the pair of braces 90 of the mounting case 34, and with the distal end 96 of the mounting case 34 being positioned within the cutout 72 of the arm 32.

The mounting case 34 further comprises a pivot pipe 98.

The pivot pipe 98 of the mounting case 34 extends rotatably within the arm 32.

The front cover 78 of the mounting case 34 further has a viewing window 100.

The viewing window 100 of the front cover 78 of the mounting case 34 is for allowing viewing of, and interfacing with, the tablet 22.

The mounting case 34 further comprises a collar 102.

The collar 102 of the mounting case 34 is received by, and rotates with, the pivot pipe 98 of the mounting case 34, and is positioned within the cutout 72 of the arm 32.

The distal end 96 of the pedestal 92 of the mounting case 34 is affixed to the collar 102 of the mounting case 34, at the cutout 72 of the arm 32, and rotates with the collar 102 of the mounting case 34 so as to allow the mounting case 34 to pivot by rotation of the pivot pipe 98 of the mounting case 34, as by double arrows 103, for allowing the user 28 to use the tablet 22 from either the inside of the forklift 26 or the outside of the forklift 26.

The mounting case 34 further comprises a release assembly 104.

The release assembly 104 of the mounting case 34 is disposed on the top wall 68 of the arm 32, adjacent to the collar 102 of the mounting case 34, and cooperates with the pivot pipe 98 of the mounting case 34.

Figure 17:
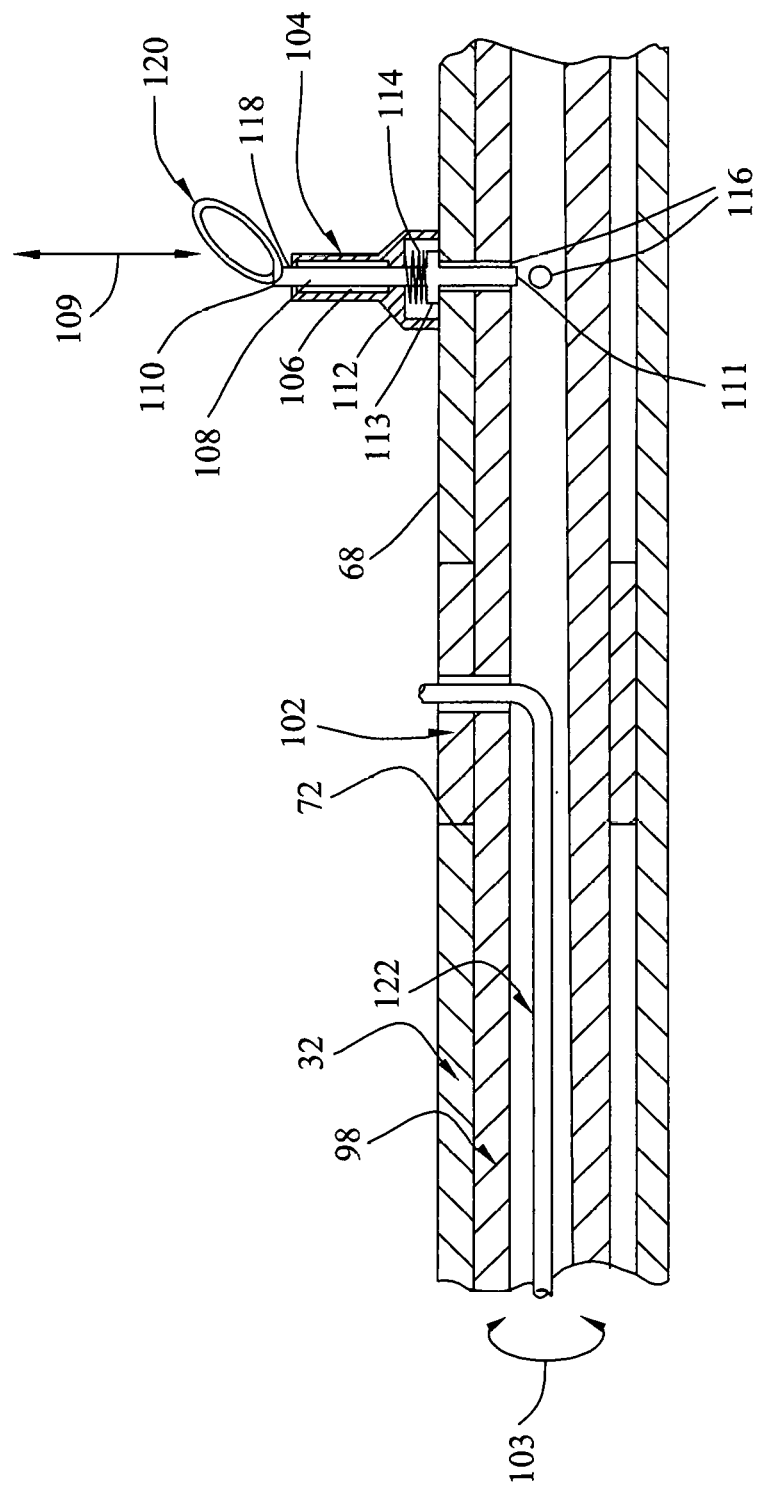
FIG. 17 is a diagrammatic cross sectional view taken along LINE 17-17 in FIG. 16.

As shown in FIG. 17, the release assembly 104 of the mounting case 34 has a housing 106.

The housing 106 of the release assembly 104 of the mounting case 34 is disposed on the top wall 68 of the arm 32, adjacent to the collar 102 of the mounting case 34.

The release assembly 104 of the mounting case 34 further has a locking pin 108.

The locking pin 108 of the release assembly 104 of the mounting case 34 is axially movably mounted, as by double arrow 109, in the housing 106 of the release assembly 104 of the mounting case 34, and has a proximal end 110 and a distal end 111.

The release assembly 104 of the mounting case 34 further has a first seat 112.

The first seat 112 of the release assembly 104 of the mounting case 34 is fixedly attached within, and to, the housing 106 of the release assembly 104 of the mounting case 34.

The release assembly 104 of the mounting case 34 further has a second seat 113.

The second seat 113 of the release assembly 104 of the mounting case 34 is disposed in the housing 106 of the release assembly 104 of the mounting case 34, and is fixedly attached to the locking pin 108 of the release assembly 104 of the mounting case 34.

The release assembly 104 of the mounting case 34 further has a coil spring 114.

The coil spring 114 of the release assembly 104 of the mounting case 34 receives the locking pin 108 of the release assembly 104 of the mounting case 34, and seats between, and against, both the first seat 112 of the release assembly 104 of the mounting case 34 and the second seat 113 of the release assembly 104 of the mounting case 34 to normally bias the distal end 111 of the locking pin 108 of the release assembly 104 of the mounting case 34 downwardly into a selected one of a pair of 90° offset through bores 116 in the pivot pipe 98 of the mounting case 34 so as to maintain the mounting case 34 in position for allowing the user 28 to use the tablet 22 from either the inside of the forklift 26 or the outside of the forklift 26.

To release the release assembly 104 of the mounting case 34, the user 28 merely pulls up on the proximal end 110 of the locking pin 108 of the release assembly 104 of the mounting case 34 causing the distal end 111 of the locking pin 108 of the release assembly 104 of the mounting case 34 to lift upwardly out of the selected one of the pair of 90° offset through bores 116 in the pivot pipe 98 of the mounting case 34 so as to unmaintain the mounting case 34 from position for allowing the user 28 to pivot the mounting case 34 and use the tablet 22 from either the inside of the forklift 26 or the outside of the forklift 26.

The proximal end 110 of the locking pin 108 of the release assembly 104 of the mounting case 34 has a through bore 118 extending laterally therethrough.

The release assembly 104 of the mounting case 34 further comprises a pull ring 120.

The pull ring 120 of the release assembly 104 of the mounting case 34 extends through the through bore 118 of the proximal end 110 of the locking pin 108 of the release assembly 104 of the mounting case 34 for facilitating pulling up on the proximal end 110 of the locking pin 108 of the release assembly 104 of the mounting case 34 and releasing the locking pin 108 of said release assembly 104 of said mounting case 34 from the pivot pipe 98 of the mounting case 44.

The mounting case 34 further comprises a charging wire 122.

The charging wire 122 of the mounting case 34 extends from the tablet 22, through the pedestal 92 of the mounting case 34, the collar 102 of the mounting case 34, and the pivot pipe 98 of the mounting case 34, and then through the arm 32 and the post 24 of the forklift 26, and to the battery of the forklift 26 for charging the battery of the tablet 22.

Method of Using the Release Assembly 104 of the Mounting Case 34 to Use the Tablet 22 that is Attached to the Forklift 26 by the Mount 20 from First Outside of the Forklift 26 and then from Inside of the Forklift 26

The method of using the release assembly 104 of the mounting case 34 to use the tablet 22 that is attached to the forklift 26 by the mount 20 from first outside of the forklift 26 and then from inside of the forklift 26 can best be seen in FIGS. 18A-18D, and as such, will be discussed with reference thereto.

If the mounting case 34 is in the inside of the forklift position and the user 28 wants to work on the floor, i.e., from outside of the forklift 26, the user 28 dismounts the forklift 26 and easily pulls the locking pin 108 of the release assembly 104 of the mounting case 34 up out of an original 90° offset through bore 116 in the pivot pipe 98 of the mounting case 34, swivels the mounting case 34 90° to an outer side of the arm 32 by way of the pivot pipe 98 of the mounting case 34 pivoting, and releases the locking pin 108 of the release assembly 104 of the mounting case 34 into the other 90° offset through bore 116 in the pivot pipe 98 of the mounting case 34 to secure the mounting case 34 from moving and thereby allowing the user 28 to use the tablet 22 from outside of the forklift 26.

If the user 28 wants to work from inside of the forklift 26 position, i.e., from inside of the forklift 26, the user 28 remounts the forklift 26 and easily pulls the locking pin 108 of the release assembly 104 of the mounting case 34 up out of the other 90° offset through bore 116 in the pivot pipe 98 of the mounting case 34, swivels the mounting case 34 90° to an inner side of the arm 32 by way of the pivot pipe 98 of the mounting case 34 pivoting, and releases the locking pin 108 of the release assembly 104 of the mounting case 34 into the original 90° offset through bore 116 in the pivot pipe 98 of the mounting case 34 to secure the mounting case 34 from moving and thereby allowing the user 28 to use the tablet 22 from inside of the forklift 26.

Impressions

It will be understood that each of the elements described above, or two or more together, may also find a useful application in other types of constructions differing from the types described above.

While the embodiments of the present invention have been illustrated and described as embodied in a method of using a mount for attaching a tablet to a post of a forklift so as to allow a user to use the tablet from either inside or outside of the forklift or to stow the tablet, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A method of using a mount for attaching a tablet to a post of a forklift so as to allow a user to use the tablet from either inside or outside of the forklift or to stow the tablet, comprising the steps of:
   a) attaching the mount to a post of the forklift such that a mounting case of the mount is inside of the forklift to allow a user to access the mounting case from inside of the forklift, the mounting case for holding a tablet;
   b) pulling a locking pin of a release assembly of the mounting case of the mount up out of a first through bore in a pivot pipe of the mounting case;
   b) swiveling the mounting case 90 degrees to an outer side of an arm by way of the pivot pipe of the mounting case pivoting, such that the mounting case is outside of the forklift; and
   d) releasing the locking pin of the release assembly of the mounting case into a second through bore in the pivot pipe of the mounting case that is 90 degrees offset from the first through bore to secure the mounting case from moving and thereby allowing a user to access the mounting case from outside of the forklift such that a user can use a tablet when that tablet is mounted in the mounting case.

2. The method of claim 1, further comprising the steps of:
   e) pulling the locking pin of the release assembly of the mounting case up out of the second offset through bore in the pivot pipe of the mounting case;
   f) swiveling the mounting case 90 degrees back to the inner side of the arm by way of the pivot pipe of the mounting case pivoting; and
   g) releasing the locking pin of the release assembly of the mounting case into the first through bore in the pivot pipe of the mounting case to secure the mounting case from moving and thereby allowing a user to access the mounting case from inside of the forklift such that a user can use a tablet when that tablet is mounted in the mounting case.

* * * * *